July 22, 1941.  E. B. HILL  2,250,262
SIDE DISCHARGE HOPPER BODY
Filed Feb. 27, 1941  2 Sheets-Sheet 2

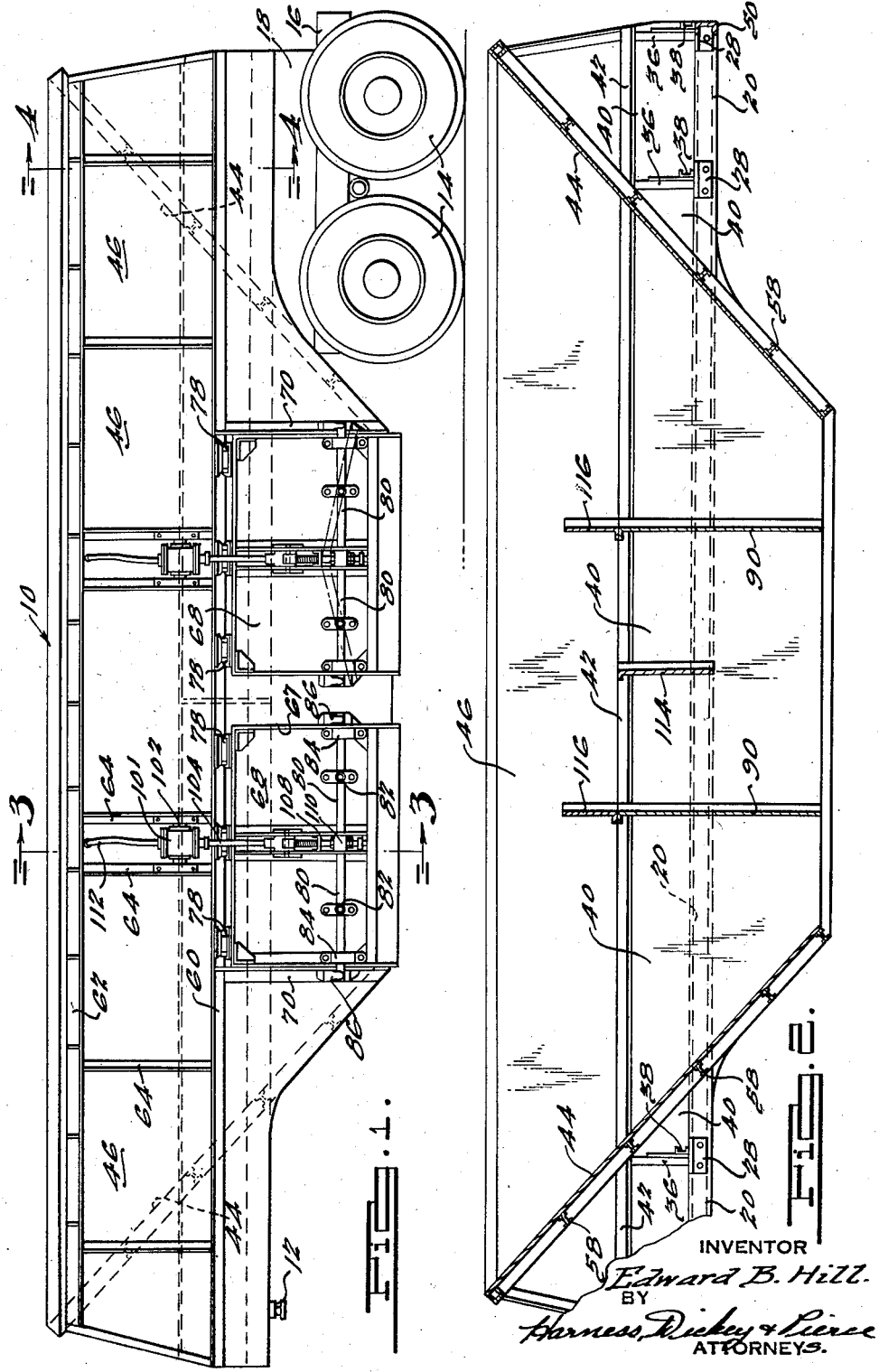

INVENTOR
Edward B. Hill.
BY
Harness, Dickey & Pierce.
ATTORNEYS.

Patented July 22, 1941

2,250,262

UNITED STATES PATENT OFFICE 2,250,262

SIDE DISCHARGE HOPPER BODY

Edward Burr Hill, Chicago, Ill., assignor to Gar Wood Industries, Inc., Detroit, Mich., a corporation of Michigan Application February 27, 1941, Serial No. 380,797

3 Claims. (Cl. 298—24)

The present invention relates to vehicle dump bodies and particularly relates to such vehicles in which the dumping is through the sides thereof.

The primary object of the present invention is to provide an improved vehicle dump body construction in which the speed of discharge therefrom is materially increased over that of prior constructions Another object of the invention is to provide a large dump body construction which is light in weight compared to prior dump bodies of similar capacity, and in which the pay load is materially increased over such prior constructions.

A further object of the invention is to provide a dump body of the type mentioned having an improved floor construction which has less tendency to break up the material, such as coal, being loaded therein and in which such floor materially contributes to speedy discharge.

A further object of the invention is to provide an improved construction and arrangement of side dump doors with respect to the body floor so that the carrying capacity and speed of discharge are materially increased.

Other objects of the invention will become apparent from the following specification, the drawings relating thereto, and from the claims hereinafter set forth.

In the drawings, in which like numerals are used to designate like parts in the several views throughout:

Figure 1 is a side elevational view of the semi-trailer type of vehicle constructed according to the present invention;

Fig. 2 is a longitudinal, vertical cross-sectional view taken substantially along the line 2—2 of Fig. 3;

Figure 3:
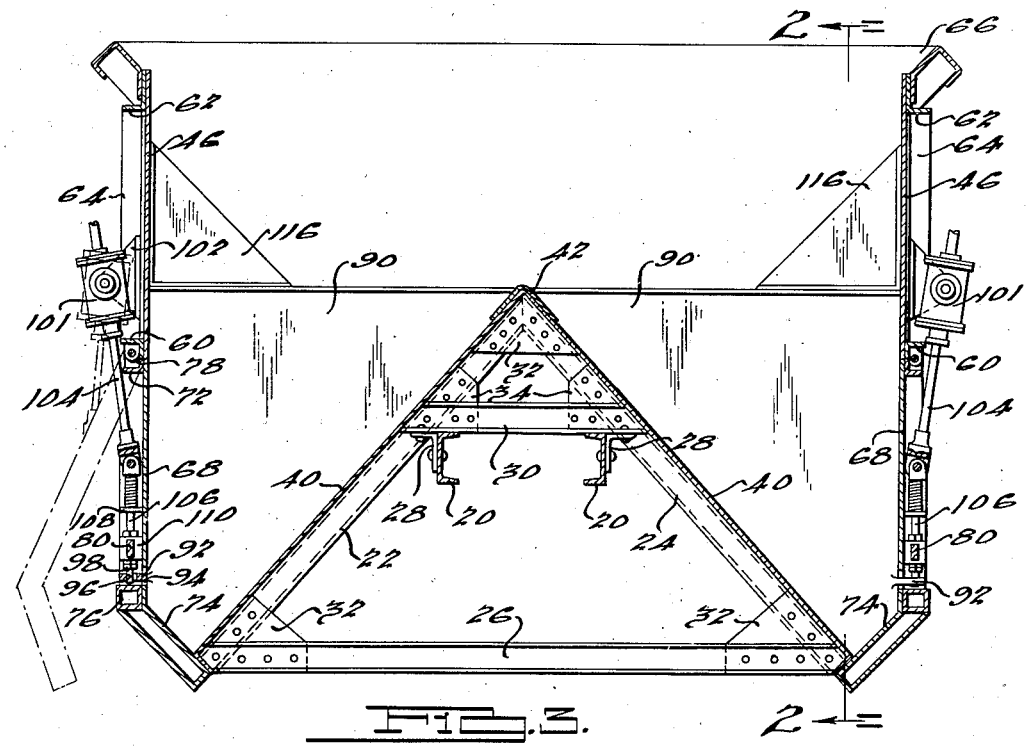
Fig. 3 is a transverse, vertical cross-sectional view taken substantially along the line 3—3 of Fig. 1.

Conventional center discharge dump bodies require open centers in the platform, and the width of such discharge openings is governed by the inside distance between the inside wheels of the vehicle. The speed of discharge of such vehicles is relatively low, and the pay load capacities of such vehicles are also relatively low, as compared with the structure of the present invention.

The vehicle dump body of the present invention is particularly adapted for use in handling coal, but it will be appreciated that it is also useful in many other fields. Speed in handling, both in loading and unloading, is an important consideration, and such speed is materially increased by the construction of the present invention. In loading material, particularly coal, into the vehicle, such coal is often dropped from substantial heights, and when it strikes the bottom of the vehicle is broken up, which reduces the value of the load. Care must, therefore, be taken in loading the vehicles to prevent undue breaking up of the coal, and such care requires time. According to the present invention, the vehicle floor is so constructed that it slopes from a central peak downwardly and outwardly toward the sides of the vehicle. As the dropped coal strikes against such sides, the force of impact is materially reduced so that the coal is not broken up to the same extent as in prior constructions, and a material saving in value and time is effected.

Also, according to the present invention, the vehicle load is dumped through side doors so that the sloping walls in cooperation with the side doors cause a rapid discharge of the material from the dump body, thereby effecting considerable saving in discharge time.

Referring to the drawings, the vehicle dump body is generally indicated at 10 and is in the form of a semi-trailer having a kingpin construction 12 adjacent the forward end thereof which is adapted to be connected to a conventional fifth wheel construction of a power tractor. Ground engaging wheels 14, there being four of such wheels on each side, are connected through conventional wheel suspension means to a truck 16. Such truck 16 is suitably connected to the rear end of the vehicle body through longitudinally extending, transversely spaced, upstanding channel members 18, which may be suitably secured to longitudinally extending supporting members 20 of the vehicle body.

The vehicle body is of the so-called "frameless" type, and it includes the longitudinally extending channel members 20 which extend substantially the full length of the vehicle body. A plurality of transversely extending rigid triangular members, formed of sides 22 and 24 and a bottom 26, are supported on the longitudinal members 20 and are secured thereto by means of angle members 28 which may be suitably secured, as by riveting, to a transversely extending bracing member 30. The triangular member is so disposed that the peak thereof, which is formed by the juncture of sides 22 and 24, is disposed upwardly and at substantially the transverse midpoint of the body. Reinforcing gusset plates 32 may be secured to the corners of the triangle, as by riveting, and similar gusset plates 34 may be secured to the corners formed by the member 30 with sides 22 and 24. The member 30 rests upon the members 20 and has one of the flanges of the angle members 28 secured thereto to fix the triangular member with respect to the members 20.

Figure 4:
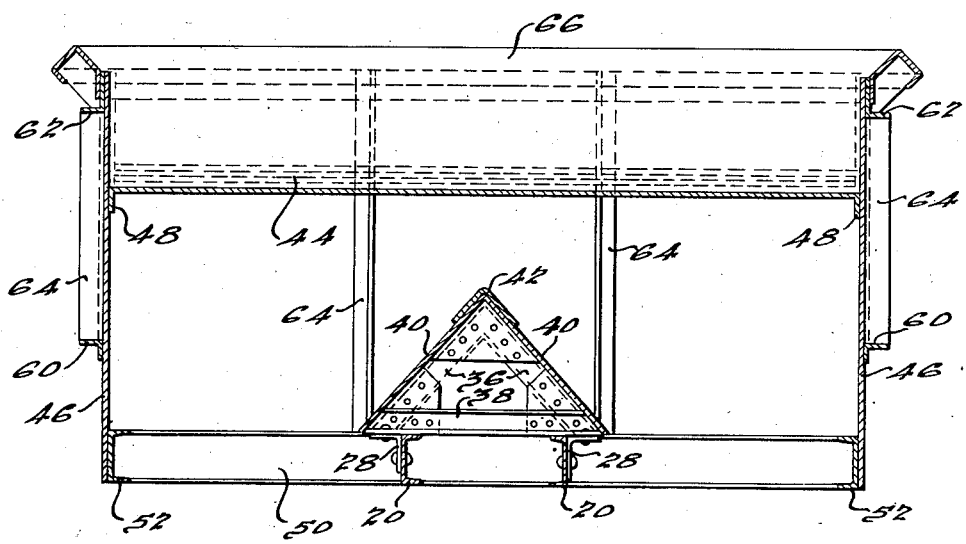
Fig. 4 is a transverse, vertical cross-sectional view taken substantially along the line 4—4 of Fig. 1.

It will be understood that any desired number of such triangular members may be spaced at suitable points longitudinally of the vehicle to provide the required strength. Such triangular members may also be of different sizes along the length of the body, as represented by the triangular member formed by channel members 36 and 38 in Figure 4, which are disposed at spaced intervals adjacent the ends of the body. The channel member 38 corresponds to channel member 30, and is secured to the longitudinal members 20 in the same manner. Reinforcing gusset plates are fixed to the corners to reinforce the structure.

The downwardly and outwardly sloping members 22, 24, and 36 of the triangular members provide the support for the vehicle floor which is formed by flat plate members 40. Such plate members 40 are secured to the upper flange of the channel members and extend the full length of the body from the peak downwardly to the juncture with the sides thereof. A longitudinally extending angle member 42 is disposed over the peaks of the triangles, and overlies the adjacent edges of the floor members 40 and is secured thereto in a suitable manner, such as by welding or riveting. The members 40 and the member 42 extend substantially the full length of the vehicle so that a rugged body is provided.

Plate members 44 form the ends of the dump body and slope downwardly and inwardly toward the longitudinal center thereof. Upstanding plate members 46 form the sides of the vehicle. Such sides 46 and end members 44 are secured together at the edges of the ends 44 through integral side flanges 48 formed on the side edges of the ends 44, which bear against the insides of side members 46 and are also secured to the floor members 40 at their junctures.

The ends 44 and sides 46 are supported upon the longitudinal members 20 by means of auxiliary frames disposed at each end of the body in which each of such frames includes transversely extending channel shaped members 50 which are suitably connected and fixed to the members 20 through such means as the triangular members 36 or other suitable structural elements. Each of such frames also includes longitudinally extending channel members 52 which are suitably secured to the members 50 and to the side plates. The sides and end members may be further supported by horizontal, vertical, and cross reinforcing members (not shown) which may be angle sections and which may be secured to the members 20, 50 or 52.

The ends 44 may be strengthened and stiffened by means of transversely extending I-beam members 58, which may be fixed to the under sides thereof. The side members 46 may be stiffened and strengthened by a longitudinally extending angle member 60 fixed to the outside thereof and running the length of the vehicle and by another longitudinally extending angle member 62 which is fixed to the top thereof and running longitudinally of the side. Also, vertically extending angle members 64 may be disposed between the angle members 60 and 62 at spaced intervals along the length of the body and otherwise suitably secured to the sides 46. Further reinforcement may be provided in the form of cross braces on the sides and also at the ends, if desired, as will be appreciated by those skilled in the art.

Downwardly and inwardly tapering border member 66 may be disposed about the upper edges of the sides of the body and may be secured thereto by welding, or otherwise, to the upstanding flange of angle members 62.

It will thus be seen that in general, the body is provided with upright side walls, downwardly and inwardly sloping end walls which provide a substantially horizontal section at the center of the body, together with a floor which tapers from the transverse center downwardly and outwardly toward the bottoms of the side walls.

The side walls are each provided with a pair of longitudinally spaced openings 67 therethrough which provide door openings for the reception of pivotally mounted doors 68. The edges of such door openings may be reinforced by metal strips 70 which are secured to the side members about the sides of the door openings, the tops of such openings being reinforced by the longitudinally extending angle member 60. The top and side edges of the door may be reinforced by angle members 72 which extend therealong and may be fixed to the doors 68 by welding or the like.

It may be seen, referring to Fig. 3, that the doors 68 have a substantially vertical portion with the lower ends terminating in downwardly and inwardly sloping portions 74 which abut against the lower edges of the bottom members 40. The lower portions 74 may be formed in box section and reinforced by horizontal box section elements 76 which may be suitably secured thereto.

Cooperating hinge members 78 may be secured, respectively, to the angle members 60 and 72 along the top edge of the door, and be pivotally connected by a suitable pivot pin so that the doors are pivotally mounted about their upper edges for swinging outwardly and upwardly, as indicated by the broken lines in Fig. 3.

Latching means are provided for latching the doors shut, and such means include lever elements 80 which are pivotally connected intermediate their ends by pivot pins 82 to the outer faces of doors 68 and which extend from the center toward the side edges of the doors. The levers 80 project through U-shaped guide brackets 84 into a position to latch behind catches 86 which may be fixed to the sides 46 or to the angle members 70 in the position shown.

Also, transversely extending separating plate members 90 are mounted interiorly of the body and extend from the bottom to the sides of the body, and are secured thereto in upright positions. Forwardly extending lugs 92 are fixed to the members 90 and project through an aperture 94 formed in each door 68. The projection 92 is provided with an aperture 96 therethrough which is adapted to receive a latch pin 98 for further latching the door shut.

Power means are provided for unlatching and opening the doors, and such power means include hydraulic cylinders 101 which may be mounted upon suitable brackets 102 secured to the sides of the body above each of the doors. A piston 104 projects downwardly from the cylinder and has the lower end thereof pivotally connected to a reciprocable connecting link 106. Such link 106 may be suitably mounted and guided within apertures through mounting members 108 secured to the outside face of the door; and the lower end of such member is attached to a connector 110 which receives the inner ends of the levers 80 therein.

The hydraulic cylinders are suitably connected with a source of hydraulic pressure, which may come from a tank and pump mounted on the power tractor through suitable conduits 112. Conduits 112 are so connected to the cylinder that the power stroke of the piston 104 is upwardly, and upon such upward movement the levers 80 and pin 98 are withdrawn from their latching positions to the positions shown in broken lines in Fig. 1. Upon such upward movement, the member 110 then abuts against the guide and stop member 108 so that further upward movement of the piston rod 104 causes the door to swing open.

As the floors 40 are sloped at a substantial angle, it will be evident that the materials within the vehicle are rapidly discharged therefrom. Viewing Fig. 3, it will be seen that the sloping portions 74 of the doors permit a steep angle on the floors 40 and at the same time increase the capacity of the body.

Other transversely extending reinforcing members 114 and 116 may be provided within the body connecting the bottoms and sides so as to further strengthen the body, if desired.

Formal changes may be made in the specific embodiment of the invention described without departing from the spirit and substance of the invention, the scope of which is commensurate with the appended claims.

What is claimed is:

1. A vehicle dump body having ground engaging wheels mounted thereon comprising longitudinal members which extend substantially the length of the vehicle; transversely extending, rigid triangular members secured to said longitudinally extending members and supported thereon, said triangular members being disposed with one corner thereof upwardly; bottom members secured to the top sides of said triangular members so that said bottom members slope downwardly and outwardly; end members supported on said longitudinal members; side members carried by said longitudinal members; and means forming doors in said side members adjacent the juncture of the floor members with the sides.

2. A vehicle dump body having supporting wheels mounted thereon, adjacent the ends thereof, comprising longitudinal members which extend substantially the length of the vehicle; transversely extending, rigid triangular members disposed with one corner thereof upwardly, said longitudinal members being disposed within said triangular members and secured thereto adjacent said upper corner; bottom members secured to the top sides of said triangular members so that said bottom members slope downwardly and outwardly; end members supported on said longitudinal members; side members carried by said longitudinal members; and means forming doors in said side members adjacent the juncture of the floor members with the sides.

3. A vehicle dump body having supporting wheels mounted thereon, adjacent the ends thereof, comprising longitudinal members which extend substantially the length of the vehicle; transversely extending, rigid triangular members disposed with one corner thereof upwardly; a transversely extending bracing member secured to each of said triangular members, said longitudinal members being disposed within said triangular members below said transversely extending bracing member and secured thereto; bottom members secured to the top sides of said triangular members so that said bottom members slope downwardly and outwardly; end members supported on said longitudinal members; side members carried by said longitudinal members; and means forming doors in said side members adjacent the juncture of the floor members with the sides.

EDWARD BURR HILL.